July 12, 1960
L. JACQUÉ ET AL
2,944,878
PROCESS FOR THE SEPARATION OF
SUBSTANCES BY VAPORIZATION
Filed March 22, 1957
2 Sheets-Sheet 1
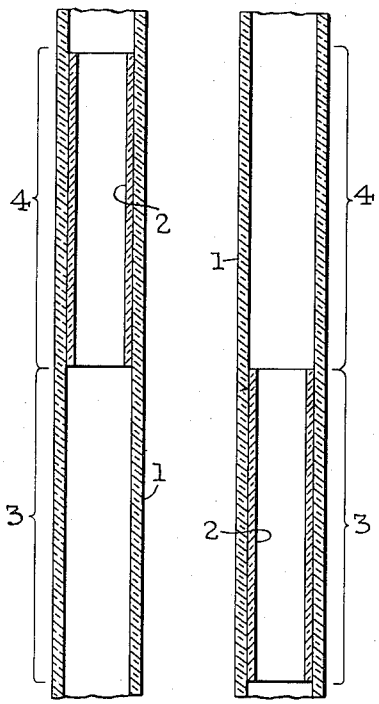
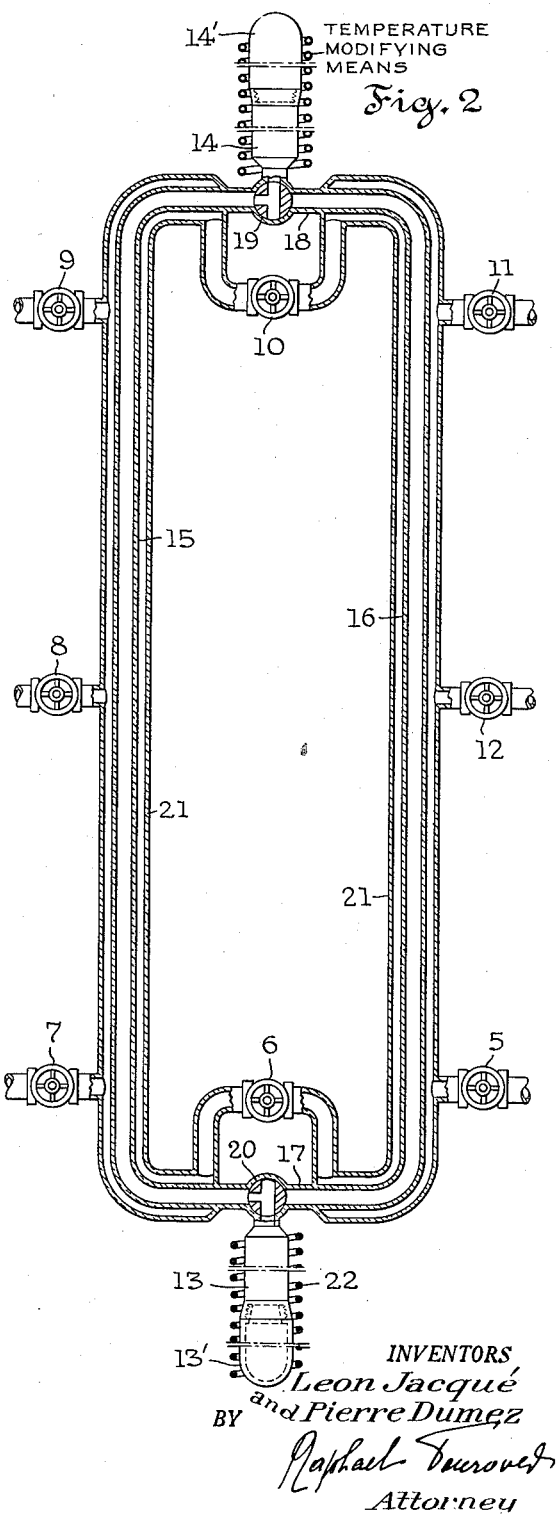
INVENTORS
Leon Jacqué
and Pierre Dumez
BY
Raphael Dourovet
Attorney

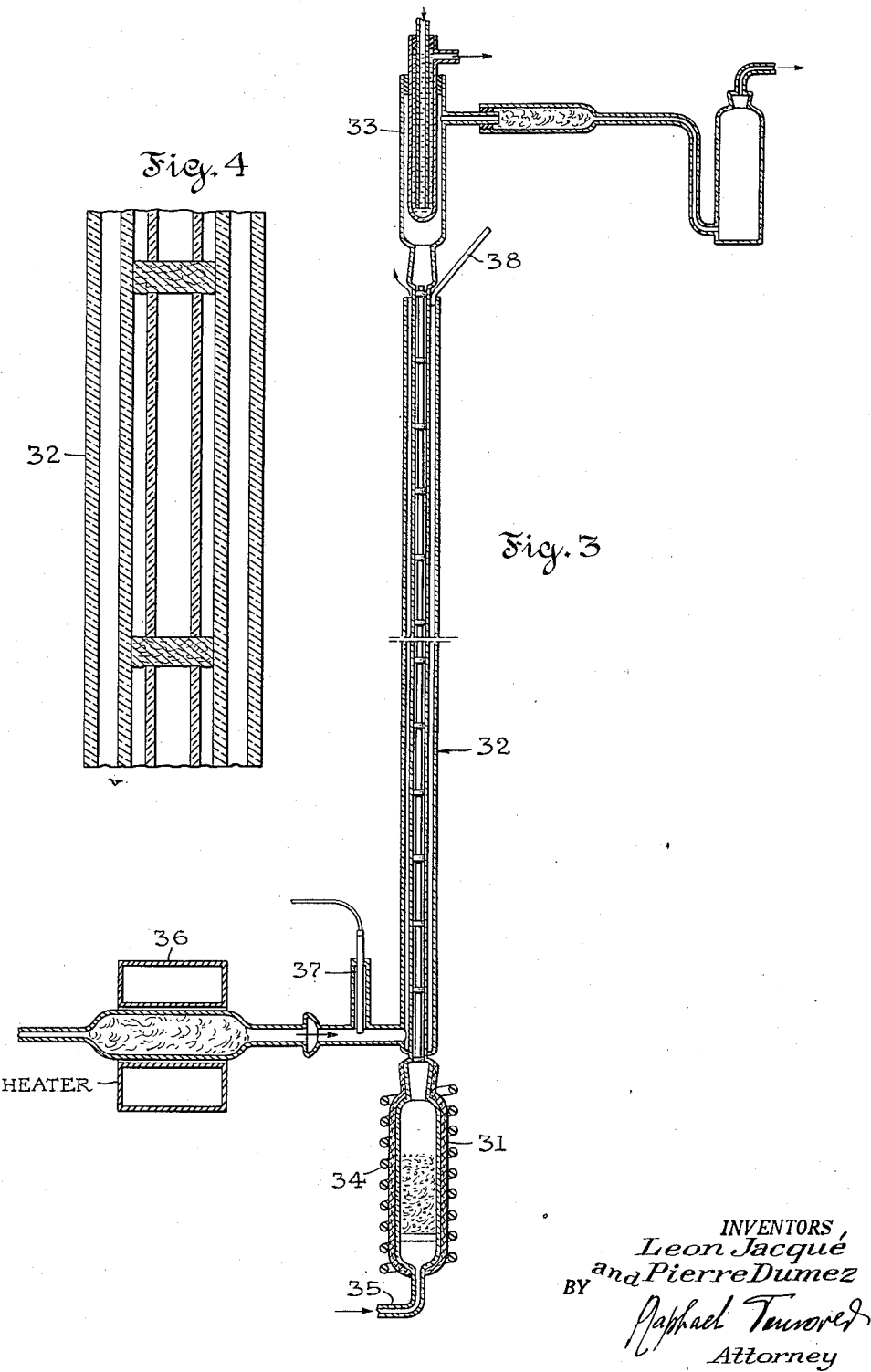

United States Patent Office 2,944,878
Patented July 12, 1960

2,944,878

PROCESS FOR THE SEPARATION OF SUBSTANCES BY VAPORIZATION

Léon Jacqué, Paris, and Pierre Dumez, Saint-Cloud, France, assignors to Pechiney, Compagnie de Produits Chimiques et Electrometallurgiques, Paris, France, a corporation of France Filed Mar. 22, 1957, Ser. No. 648,469

Claims priority, application France Apr. 3, 1956

13 Claims. (Cl. 23—294)

The present invention relates to a new process for the partial or complete separation of different substances by vaporization.

As is known, vaporization is frequently used in industry in separation processes; when liquids are involved, the operation is generally carried out with boiling, that is to say by means of distillation.

It is known to use the direct vaporization of solids—without passing through the liquid state—for purifying or separating certain substances. Thus, sublimation is applied in industry in several cases, for example, in the case of iodine, camphor, naphthalene, etc. However, fractional sublimation as practiced up to now gives satisfactory results only when the vapor pressures of the substances to be separated differ sufficiently from each other. If, on the contrary, the vapor pressures of the substances present differ but slightly, the operation becomes the more laborious the closer the vapor pressures are to each other and, in actual practice, a satisfactory purification or separation is no longer obtainable.

The great drawback in fractional sublimation resides in the absence of reflux which—in contrast—is freely (willingly) used in the distillation of liquids in order to obtain as complete a separation as possible.

The present invention brings about an improvement which obviates these difficulties and makes possible a very complete purification or separation in cases where the known methods of sublimation or distillation give unsatisfactory results; further, in those cases where conventional processes can be used, the new process enables the desired result to be obtained more rapidly and with a better yield.

The process according to the present invention consists, first, in heating the mass of the substances to be treated—preferably, in a comminuted state—in such a manner that a temperature gradient is established between different portions of the said mass, the temperature of the hottest portion being so selected that there is produced an appreciable vaporization of at least one of the substances present. When, as a result of this operation, one or more of the said portions becomes enriched with at least one of the components of the mixture, then, they are separated from the other portions.

Preferably, the temperature gradient is established in such a manner that one or more of the components of the mixture are condensed, partially or entirely, in the heated portions.

According to another feature of the invention, heating with a temperature gradient can be carried out either on the initial mixture to be treated, or on condensates formed by the condensation of vapors evolved from that mixture, or on both said mixture and said condensates, simultaneously or successively.

Thus, instead of heating the entire mixture of substances to a given temperature and condensing the evolved vapors at another temperature—as is done in known processes—there is established, according to the process of the invention, a whole sequence (series, succession) of temperatures varying between two extreme points or zones of the mixture.

For example, a mixture of sublimable components to be separated is vaporized within a fractionation column, wherein the temperature at which the mixture to be treated has a strong vapor pressure, and a temperature at which only the most volatile constituents have an appreciable vapor pressure. If this thermal gradient is established in a sufficiently graduated manner, the fractions condensed within the hottest portion of the column are enriched with the less volatile components, while the fractions condensed within the coldest portion of the column are enriched with the most volatile components. By progressing thereafter the highest temperature front along the column, it is possible to collect a fraction enriched with the most volatile constituents, while there remains in the bottom of the column a condensed fraction enriched with the least volatile part.

During the upward progression of the temperature gradient, each condensed fraction undergoes a continuous succession of vaporizations and condensations; inasmuch as the vapor phase is fundamentally richer in volatile products than the solid phase in contact therewith, the most volatile fractions move forward more rapidly than the less volatile fractions. The bottom fractions of the condensing zone become constantly poorer in volatile elements in favor of the overhead (top) fractions, the purity of the obtained products depending upon the length of travel within the column.

Another important feature of the new process resides in varying the said temperature gradient as a function of time and/or space, according to the nature of substances treated, the degree of purification or separation desired, or according to other conditions specific to the industrial problem under consideration.

Thus, in carrying out the invention, the series of heating temperatures is frequently progressed as a function of time, from a portion of the chamber containing the mixture to be treated, towards the other portions thereof. Eventually, depending upon the shape (slope) of the curves representing the vapor pressure of the vaporized substances as a function of temperature, the temperature gradient can be narrowed down or spread out in the course of its progression.

It may be advantageous to carry out the new process in the presence of a stream of an inert (carrier) gas designed to entrain the vapors given off by the solids or liquids of the treated mixture.

One variant of the novel process according to the invention, consists in controlling the velocity of the entraining gas stream according to the specific vaporization rates of the components of the mixture. Indeed, it happens that two substances which have vapor pressures which are very close together, vaporize at sufficiently different rates so that the vapor of one of them can be entrained in a greater proportion by a suitable gas flow, based upon the evaporation rate of the most rapidly vaporizing of the two substances. The fractionation resulting from the application of a definite temperature gradient is then enhanced by the flow of the entraining gas stream.

According to another feature of the invention, the solids, or a portion of the treated solids, are kept suspended in a gaseous stream according to the known fluidization technique.

It will be understood that the process of the invention can be carried out as a batch or as a continuous operation.

Further, the new process is applicable whatever be the pressure of the operation; it can be carried out at normal pressure, as well as at high or reduced pressures.

One embodiment which enables the efficiency of fractional sublimation to approach that of distillation consists in effecting reflux of the solids in one or more portions of the chamber wherein the mixture is heated. Depending upon the position of the chamber, this reflux is obtained by the free fall of the comminuted solids, or by their transportation through the interior space of the chamber by mechanical means.

A variant of the invention enables the concentration or separation of the sublimed substances to be obtained with apparatus of considerably reduced dimensions, even in those cases where the same concentration or separation would require columns of prohibitive length, or a large number of columns. This variant of the method of carrying out the invention consists in effecting the sublimation in a continuous or discontinuous manner in closed cycles, whereby a succession of vaporizations and condensations of the same vapor takes place several times in the same regions of the space wherein the operation is carried out. This variant can be carried out in various ways. According to one procedure, the temperature gradient is periodically inverted, that is, the coldest parts during one operation are heated to a higher temperature in the course of the following operation, and conversely.

Another procedure consists in periodically transferring, within the space in which the operation is carried out, all or a portion of the condensates from one region of the space into another.

A particularly practical manner of carrying out said variant consists in effecting successive vaporizations in continuous cycles, within a space having closed-circuit paths.

The chambers (enclosures) for carrying out the process of the invention can be constituted of various apparatus known in the distillation and sublimation art, provided that they are equipped with the necessary heating means for creating a temperature gradient between at least two different zones (regions).

Columns, similar to distillation columns, are particularly appropriate for this purpose, but they can be horizontal as well as vertical or inclined. As in fractional distillation, the height of the column can be adjusted to the degree of separation desired. While columns having an empty (free) interior space can be used, internal packings or plates are preferable. Curved columns can also be used.

The heating means, provided in the apparatus to be used, should permit the temperature to be regulated on different levels; the heating means can be fixed or movable along the columns. The heating can be by means of a fuel or electricity.

The column can, for example, be surrounded with a double casing wherein is circulated a hot fluid, if necessary, with injection at a plurality of points. Auxiliary internal or external heating means can also be provided. In this way, the temperature gradient between the top and the bottom of the column can be regulated by controlling the flow or flows and the temperature or temperatures of the inlet air.

The heating can be obtained by one or more electric gradient furnaces, which are adapted to be displaced along the column.

When it is required to vary the temperature curve—i.e. the curve representing the temperature as a function of distance from the point where heating begins—between the extreme values defining the gradient in accordance with the invention, it is advisable to use cooling means disposed at suitable distances from the heating means at one or more levels of the column, and not merely at the top thereof. In one embodiment of the invention, the cooling means are movable and displaceable along the column. The column is then generally also provided with movable heating means; in this way, the heated zones and the cooled zones can not only be progressively advanced along the column, but these zones can also be brought closer together or separated from each other.

Hence, in addition to the new process, the invention comprises special columns for use in fractional vaporization, characterized in that they are provided with heating means and, eventually, also with cooling means, adapted for modifying as a function of time the temperatures along the column. In particular, the invention comprises the use of columns provided with movable heating and/or cooling means. Known moving means, e.g. mechanical, magnetic, electric, pneumatic, etc. can be used, with the heating and/or cooling means placed inside or outside of the columns.

For example, the cooling device can be constituted of a water circulation cooler or of a row of air blast pipes surrounding a section of the column, and displaced by a motor on a rack system towards the top of the column, the automatic movement being regulated in advance (preset) in accordance with the rate of the fractional vaporization.

A few embodiments of the apparatus which can be used for carrying out the invention are shown diagrammatically —by way of example only, and not by way of limitation— on the attached drawings, wherein Figures 1A, 1B, and 2 illustrate apparatus particularly adapted for carrying out variants of the invention applied to sublimation;

Figure 3 shows a simple column for carrying out in various ways the process of the invention.

Figure 4 shows on an enlarged scale a portion of the column illustrated in Figure 3.

The variant of the invention which consists in periodically inverting the temperature gradient, can be carried out in any known column; to this end, the column must be provided with heating means and, eventually, with cooling means which are adjustable within sufficiently wide temperature limits and enable the inversion of the temperature gradient between different portions of the column.

The apparatus for periodically transferring solids condensed within the column can include one or more tubes adapted to slide within the column.

Figure 1A shows a portion of a column 1 containing a sliding tube 2 within the region or zone 4; the sliding tube 2 can be displaced so as to take up the position shown, for example, in Figure 1B, where it is located within the region or zone 3. The tube can also be withdrawn from the column. The figures illustrate but a single tube 2 but, actually a certain number of tubes— in series or parallel—can be used according to the length of the column and the working requirements.

The means for displacing and fixing the tube 2 in the different zones of the column are not shown in Figures 1A, 1B; various known means can be used for these purposes, such as rods, wedges, magnets, electromagnets, etc.

The sections of the column shown in Figures 1A, 1B can be used to explain a phase or stage of the sublimation operation according to the present invention. If the sublimation has proceeded from zone 3 towards zone 4, the sublimate deposits in zone 4 in the interior of tube 2 (Fig. 1A). It is then sufficient to push tube 2 into zone 3 (shown on Figure 1B) for the product condensed within the tube 2 to undergo sublimation in its turn without having to lengthen the column. The saving amounts here to a length of column equal to that of tube 2. It is obvious that the repetition of such an operation— eventually with a plurality of sliding tubes—amounts to a saving of a considerable length of column.

A particular manner of using the above-described arrangement consists in displacing the internal sliding tubes at the same velocity at which the zone of condensed products is displaced. When the desired degree of purification has been attained, and the overhead and bottom fractions removed, the sliding tube or tubes are brought back mechanically to their initial position, and the operation is resumed with additional quantities of starting product.

The apparatus for carrying out the variant of the process which operates with continuous cycles in a closed circuit can be constituted of at least two ducts, each end of one duct being in communication with one end of the other duct. The apparatus can equally comprise a conduit of circular shape, or of another closed line, wherein vapors can always circulate in the same direction by the effect of suitably applied temperature gradients.

The apparatus shown in Figure 2 comprises two tubular arms or branches 15 and 16, forming a sublimation column, connected by the transverse branches 17 and 18. The assembly 16, 17, 15, 18 constitutes a closed circuit path. This path is surrounded with a jacket 21 for passing a hot fluid. Valves 5, 6, 7, 8, 9, 10, 11 and 12, situated at several levels of the jacket 21, serve to control the inlet and outlet of the heating fluid. The transverse branch 17 of the sublimation column is connected, through the three-way valve 20, with a feeding (charging) chamber 13. Similarly, the transverse branch 18 communicates through valve 19 with the receiver (collector) 14 for the sublimated products. Chambers 13, 14 comprise removable sections 13', 14'.

Obviously, the apparatus can assume forms different from that shown in Figure 2. For example, the arms 15 and 16 can be constituted of bundles of tubes or of casings. Several feeding inlets and several outlets for removing sublimated products can be provided. Heating can be provided by electric resistors, by radiation, or by any other means which can, moreover, be displaceable along the tubes within which the sublimation takes place. Moreover, the tubes can be provided with fins, suitable packings, or other means adapted to increase the exchange surface.

A sublimation operation can be carried out with this apparatus in the following manner:

First, there is heated a portion of the branches of the column—for example, branch 15; for this purpose, valve 5 is opened in a duct communicating with a source of heating fluid (air). Valves 6 and 9 are opened, while 7, 8, 10, 11 and 12 remain closed. The heating fluid leaves the apparatus through 9. The chamber 13', which contains the sublimable product to be separated into its components, is placed in communication with the branch 15 by means of the three-way valve 20, the direct passage from 13 to 16 being then closed off. By means of the electric heating device 22, the product is sublimated and condenses in the branch 15. The temperature gradient applied between the ends of branch 15 causes fractionation of the sublimate; the most volatile fractions reach the three-way valve 19 through which they pass into the receiver 14. When a sufficient quantity of overhead fractions has been collected in 14', valve 19 is turned so as to cut off communication with 14, and permit passage of the vapors through 18 into branch 16.

By suitably varying the temperature distribution and by suitably manipulating valves 9, 11, 12, etc., the condensation zone is progressed into the branch 16. When the sublimated product has progressed sufficiently in this branch, the residual bottom fractions can eventually be withdrawn by the use of receiver 14'. The new overhead fractions can, if necessary, be removed at 13 by means of a receiver substituted for the container holding the starting products; thereupon, the branch 16 is placed in communication with 15 by means of valve 20, and sublimation is continued in branch 15.

It is also possible to reconnect 15 and 16 with the reservoir or container 13' for the starting products, when the condensed fraction having a composition equal to that of the starting product passes into branch 17; the amount of the starting product, thus reintroduced, replaces the withdrawals and, thereafter, participates in the continued separation operation. In this manner, the operation of the apparatus is entirely continuous.

It is understood that the location, the time and the duration of the discharges (withdrawals) and/or of the feeds (chargings) vary according to the nature of the substances to be separated and the degree of separation desired.

The condensation zone can travel (progress) over a portion only of the path (circuit, cycle) 15, 18, 16, 17 or, on the contrary, can travel several times over this path before the discharges and/or feeds are carried out.

The described column can be used according to the methods known in distillation: feeding and discharging can be automatic; several similar columns can be mounted in a series (cascade) arrangement, the feed of one constituting the product discharged as overhead or as residue from the preceding column, and so on.

In the foregoing, there has been described two embodiments of apparatus pertaining for use in the sublimation of solid substances; however, the apparatus is equally suitable for the fractional vaporization of various liquids: organic, inorganic, metallic, etc. In these cases, means are provided for supporting liquid condensates at several levels of the column; for this purpose, there can be used the conventional plates of distillation columns or, for example, a series of cups or buckets disposed along the entire length of the column. The apparatus can be used both for vaporizing below the boiling point and in distilling.

The described process and apparatus enable a high degree of purification of many substances as, for example, iodine, sulphur, salicylic acid, camphor, benzoic acid, naphthalene, arsenic, arsenic oxide, chloride of mercury, magnesium, calcium, cadmium, zinc, silver, manganese. Furthermore, the present invention makes possible certain purifications which are very difficult, and which cannot be obtained by conventional fractional sublimation; that is, for example, the case of the separation of several rare earth metals and metals having unsaturated internal shells (layers). Thus, mixtures of compounds of niobium and of tantalum or of zirconium and hafnium, can be successfully treated by the process of this invention. The present process is also applicable to compounds of thorium and uranium capable of being sublimated.

The invention will be illustrated with an example of the elimination of hafnium from a zirconium salt, which is a particularly interesting case because of the known difficulties encountered in carrying out this separation by conventional methods. Of course, this illustration is not by way of limitation, the scope of the invention being defined by the present specification and the appended claims.

*Example 1*

The fractional sublimation of zirconium bromide $ZrBr_4$ containing 2% of $HfBr_4$, is carried out in an apparatus of glass (Pyrex) which melts with difficulty, thus enabling the use of a temperature of 450° C.

The apparatus (Fig. 3) is composed of three essential parts: a lower chamber or reservoir 31 of extended shape, a column 32 surmounting the chamber, and a cooling tube 33 surmounting the column. The chamber 31 is covered with a layer of asbestos on which is coiled an electric heating resistance 34. The upper part of chamber 31 is connected by a ground glass joint with the inlet of the column. At the bottom of the chamber there is provided a tube 35 for the introduction of nitrogen.

The column 32 has a height of 2 meters; it is formed of a tube of 20 mm. external and 16 mm. internal diameter. It is filled with silica-wool plugs (wads) separated by glass tubes 12 mm. in diameter and 50 mm. in length. The inner tube of the column proper is surrounded with a casing of 35 mm. external and 30 mm. internal diameter, serving as a hot air jacket. An inlet for air heated in furnace 36 is connected to the bottom of the jacket. The temperature of the air at the inlet is measured by means of the thermoelectric couple 37. At the top of the column, the temperature is determined by means of the thermometer 38.

Within the reservoir or chamber 31, there were placed on a porous plate of sintered glass 47 g. of Zr bromide containing 2% HfBr$_4$. The chamber was heated to 360° C.; a stream of nitrogen was passed therethrough at a rate of 9 liters per hour.

At the beginning of the operation, the volume of the heating air passed through the jacket surrounding the column was 7500 liters per hour. The temperature was then 324° C. at the bottom of the column, and 180° C. at the top thereof, that is to say, a gradient of 144° C. for 2 meters. The bromides sublimating from chamber 31 condensed within the column. Every half hour, the temperature at the bottom of the column was progressively raised, in a discontinuous manner; for this purpose, the heating was regulated at 36 and at 34. In this way, and after five (5) hours, the temperature at the bottom of the column attained 436° C., and at the top 233° C., that is to say, a gradient of 203° C.

Whereas, at the start of the operation, the zone containing condensed bromides extended over a height of about 80 cm. from the bottom of the column, it began only at a level of 77 cm. from the bottom at the end of the operation, and extended up to the cooler. At that time, the product thus condensed amounted to 85% of the initial mass introduced into the lower chamber 31; the fractions deposited at a distance comprised between 77 and 97 cm. from the bottom of the column and forming 50% of the condensate, contained only 0.5% Hf. The remainder of the condensate contained an amount of Hf varying from 1.5 to 9%. On the tube of the cooler 33 there was found 2.5% of a condensate containing 16% Hf. By separating the portion enriched in Hf and repeating the operation with the condensate impoverished in that element, the content of Hf was lowered to below 0.2%.

*Example 2*

The apparatus of Figure 2 was used in the treatment by sublimation of zirconium chloride containing 1% hafnium chloride. The sublimated product was passed seven (7) times through a column 2 m. in length. Hence, altogether, it travelled a total distance of 14 m. with a succession of condensations and sublimations. The temperatures at the ends of the sublimating mass were 310° and 210° C. at the beginning, as against 370° and 250° C. at the conclusion of the treatment.

There were recovered about 25 parts of purified ZrCl$_4$ containing less than 0.02% HfCl$_4$, 50 parts ZrCl$_4$ with an average content of 0.5% HfCl$_4$, and about 25 parts of ZrCl$_4$ enriched with HfCl$_4$, the average content of the latter being 3%. The product, having an 0.5% HfCl$_4$ content, remained in the circuit for the succeeding operations.

We claim:

1. Process of separating a solid mixture into solid components of different volatilities, comprising the steps: subjecting the mixture to vaporizing conditions in a vaporizing zone; establishing in a fractionating zone connected to said vaporizing zone a temperature gradient whereby the temperature in said fractionating zone progressively decreases from approximately the temperature in said vaporizing zone to approximately the vaporization temperature of the most volatile component to be recovered; passing the vapors from the vaporizing zone through the fractionating zone, whereby the vapors of at least one component are condensed therein in solid state; thereafter displacing the temperature gradient in the fractionating zone relative to the vaporizing zone, whereby at least one condensed component is revaporized and leaves the fractionating zone in the vapor state, and recovering the vapor thus revaporized.

2. Process of separating a solid mixture into its solid components of different volatilities comprising the steps: subjecting the mixture to vaporizing conditions to vaporize at least one of its components; establishing in an extended zone a temperature gradient whereby the temperature of the hottest region in said zone decreases progressively from approximately the temperature of said vaporized components; passing the vapors through said extended zone whereby the vapors are progressively condensed therein in solid state; thereafter displacing the region of hottest temperature in the extended zone and thereby correspondingly displacing the temperature gradient in the zone and revaporizing at least one condensed component which leaves the zone in the vapor state, and recovering the component so vaporized.

3. Process according to claim 2, wherein the vaporization of the components takes place in the presence of an inert carrier gas.

4. Process according to claim 2, wherein the revaporization is repeated a plurality of times and the successive revaporizations take place in a closed circuit path.

5. Process according to claim 2, wherein the temperature gradient is periodically inverted.

6. Process according to claim 2, wherein the condensed components are mechanically displaced within the zone.

7. Process according to claim 2, wherein the mixture subjected to vaporization is a finely divided comminuted solid, and a gas is passed through the mixture to convert thereby the comminuted solid into a fluidized, liquid-simulating state.

8. Process according to claim 2, wherein a mixture of sublimable solids is subjected to fractional sublimation.

9. Process according to claim 2, wherein the vapors in the zone are subjected to reflux with condensed components.

10. Process according to claim 2, wherein the temperature gradient is displaced a plurality of times, and a plurality of components are recovered.

11. Process according to claim 2, wherein the vapors passed through the extended zone are of a condensed component derived from a prior operation of the process.

12. Process according to claim 3, wherein the components to be separated have different rates of vaporization, and the velocity of the carrier gas is controlled to entrain the most rapidly vaporizable component.

13. Process of separating a solid mixture into its solid components of different volatilities, comprising the steps: subjecting the mixture to be treated to vaporizing conditions to thereby evolve vapors therefrom; establishing in an extended zone a temperature gradient between a high temperature front at which the mixture has a strong vapor pressure and a temperature at which only the most volatile components have an appreciable vapor pressure; passing the evolved vapors through said extended zone, whereby vapors of components are progressively condensed therein in solid state; thereafter progressing the high temperature front in the extended zone to thereby revaporize a fraction of said mixture enriched with the most volatile components, while a fraction enriched with the least volatile components remains in a condensed state, and separately recovering the said fractions.

References Cited in the file of this patent

UNITED STATES PATENTS

| 1,582,861 | Van Arkel et al. | Apr. 27, 1926 |
|---|---|---|
| 1,758,741 | Gaskill | May 13, 1930 |
| 2,035,454 | Betterton | Mar. 31, 1936 |
| 2,160,969 | Hansgird | June 6, 1939 |
| 2,368,319 | Muskat | Jan. 30, 1945 |
| 2,409,835 | Clark et al. | Oct. 22, 1946 |
| 2,816,814 | Plucknett | Dec. 17, 1957 |
| 2,860,948 | Fried | Nov. 18, 1958 |

UNITED STATES PATENT OFFICE

CERTIFICATE OF CORRECTION

Patent No. 2,944,878                         July 12, 1960

Léon Jacqué et al.

It is hereby certified that error appears in the printed specification of the above numbered patent requiring correction and that the said Letters Patent should read as corrected below.

Column 2, line 6, after "wherein the" insert -- temperatures vary according to a suitable gradient between a --; line 33, after "and/or" insert -- of --; column 8, line 10, for "recavporizing" read -- revaporizing --.

Signed and sealed this 27th day of December 1960.

(SEAL)
Attest:

KARL H. AXLINE
Attesting Officer

ROBERT C. WATSON
Commissioner of Patents